United States Patent
Arisawa et al.

(10) Patent No.: US 8,687,799 B2
(45) Date of Patent: Apr. 1, 2014

(54) DATA PROCESSING CIRCUIT AND CONTROL METHOD THEREFOR

(75) Inventors: Shigeru Arisawa, Tokyo (JP); Seiji Esaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1803 days.

(21) Appl. No.: 11/059,413

(22) Filed: Feb. 17, 2005

(65) Prior Publication Data

US 2005/0201552 A1 Sep. 15, 2005

(30) Foreign Application Priority Data

Mar. 4, 2004 (JP) ................ P2004-060998

(51) Int. Cl.
*G06F 21/00* (2013.01)
*H04L 9/00* (2006.01)
*H04L 9/06* (2006.01)
*G06F 1/08* (2006.01)
*G06F 1/10* (2006.01)
*G06F 1/12* (2006.01)
*G06F 1/32* (2006.01)
*G06F 21/72* (2013.01)

(52) U.S. Cl.
CPC .............. *H04L 9/002* (2013.01); *H04L 9/003* (2013.01); *H04L 9/0612* (2013.01); *G06F 1/08* (2013.01); *G06F 1/10* (2013.01); *G06F 1/12* (2013.01); *G06F 1/3203* (2013.01); *G06F 21/72* (2013.01)
USPC ............... 380/28; 380/43; 380/277; 713/189; 713/300; 713/400; 713/401; 713/500; 708/250; 708/251; 708/255

(58) Field of Classification Search
CPC .............. G06F 1/08; G06F 1/10; G06F 1/12; G06F 1/3203; G06F 21/72; H04L 9/0612; H04L 9/002; H04L 9/003
USPC .............. 380/28, 277, 43; 713/500, 189, 300, 713/400, 401; 708/255, 251, 250
See application file for complete search history.

(56) References Cited

U.S. PATENT DOCUMENTS 4,932,053 A 6/1990 Fruhauf et al.
5,541,547 A * 7/1996 Lam .............................. 327/355
(Continued)

FOREIGN PATENT DOCUMENTS

JP 2000-083109 A 3/2000
JP 2000-259799 A 9/2000
(Continued)

OTHER PUBLICATIONS

P. Kocher, J. Jaffe, B. Jun, "Differential Power Analysis," Advances in Cryptology—Crypto 99 Proceddings, Lecture Notes in Computer Science vol. 1666, M. Wiener ed., Springer-Verlag, 1999.

(Continued)

*Primary Examiner* — Cordelia Zecher
*Assistant Examiner* — Sarah Su
(74) *Attorney, Agent, or Firm* — Rader, Fishman & Grauer PLLC

(57) ABSTRACT

When an encryption processing circuit encrypts data, a current flows in the encryption processing circuit. A noise current generated by a noise generation circuit is superimposed on the current consumed by the encryption processing circuit. The present invention is applicable to an IC chip that encrypts plaintext data using a key, thus preventing the key from being broken by DPA attacks based on analysis of the current consumption to provide high security.

13 Claims, 7 Drawing Sheets

(56) References Cited

U.S. PATENT DOCUMENTS

| | | | | |
|---|---|---|---|---|
| 5,671,284 | A * | 9/1997 | Buer | 380/29 |
| 6,327,661 | B1 * | 12/2001 | Kocher et al. | 713/193 |
| 6,419,159 | B1 * | 7/2002 | Odinak | 235/492 |
| 6,509,861 | B2 * | 1/2003 | Watanabe | 341/157 |
| 6,698,662 | B1 | 3/2004 | Feyt et al. | |
| 7,127,620 | B2 * | 10/2006 | Boeckeler | 713/194 |
| 7,295,671 | B2 * | 11/2007 | Snell | 380/28 |
| 7,417,468 | B2 * | 8/2008 | Verbauwhede et al. | 326/112 |
| 8,407,452 | B2 * | 3/2013 | Yoshimi | 712/36 |
| 2002/0041243 | A1 * | 4/2002 | Fukuhara et al. | 341/131 |
| 2002/0124178 | A1 * | 9/2002 | Kocher et al. | 713/193 |
| 2002/0131035 | A1 * | 9/2002 | Watanabe et al. | 356/5.1 |
| 2002/0131596 | A1 * | 9/2002 | Boeckeler | 380/252 |
| 2003/0005321 | A1 | 1/2003 | Fujioka | |
| 2003/0063541 | A1 * | 4/2003 | Nagata et al. | 369/59.11 |
| 2003/0122138 | A1 * | 7/2003 | Kash et al. | 257/80 |
| 2003/0185392 | A1 | 10/2003 | Sun | |
| 2003/0219126 | A1 | 11/2003 | Wuidart | |
| 2005/0055596 | A1 * | 3/2005 | Abe et al. | 713/500 |
| 2007/0101172 | A1 * | 5/2007 | Ohyama | 713/300 |

FOREIGN PATENT DOCUMENTS

| | | |
|---|---|---|
| JP | 2007-116215 A | 5/2007 |
| WO | WO-00/72117 A1 | 11/2000 |
| WO | WO-03/101020 A1 | 12/2003 |

OTHER PUBLICATIONS

EPO Search Report mailed on Aug. 4, 2006.

Papul Kocher, et al., "Differential Power Analysis", 1999, 19th Annual International Cryptology Conference, Santa Barbara, CA, Aug. 15-19, 1999. Proceedings, Lecture Notes in Computer Science, vol. 1666, Berlin, Springer, DE, pp. 388-397, XP000863414, ISBN: 3-540-66347-9.

* cited by examiner

DATA PROCESSING CIRCUIT AND CONTROL METHOD THEREFOR

BACKGROUND OF THE INVENTION

1. Field of the Invention

The present invention generally relates to a data processing circuit and a control method therefor. More specifically, the present invention relates to a data processing circuit and a control method therefor that provide high security against theft of an encryption key used for an encryption scheme, such as DES (Data Encryption Standard).

2. Description of the Related Art

In systems using IC (Integrated Circuit) cards and readers/writers, for example, data to be exchanged between the IC cards and the readers/writers is encrypted using encryption keys to prevent data tampering or wiretapping.

Encryption schemes are roughly classified into a shared key type and a public key type. In the shared key type, data is encrypted and decoded using the same encryption key, called a shared key, and one known encryption scheme of the shared key type is DES. In the public key type, data is encrypted and decoded using separate encryption keys, called a public key and a private key, and one known encryption scheme of the public key type is the RSA (Rivest, Shamir, Adeleman) algorithm.

Generally, encryption is carried out by a hardware encryption circuit, such as a single IC, because the encryption scheme and the encryption key can easily be broken (found) if the encryption procedure can be observed. In this case, for example, unencrypted data (or plaintext) and encrypted data (or ciphertext) thereof can be observed outside the encryption circuit, which is an IC. However, it is difficult to break the encryption scheme and the encryption key used by the encryption circuit for encryption from the plaintext and the ciphertext.

Recently, a technique that allows an encryption key used by an encryption circuit to be decoded by analyzing the power consumption (current consumption) of the encryption circuit, called DPA (Differential Power Analysis), has been proposed (see, for example, P. Kocher, J. Jaffe, B. Jun, "Differential Power Analysis," Advances in Cryptology—Crypto 99 Proceedings, Lecture Notes In Computer Science Vol. 1666, M. Wiener ed., Springer-Verlag, 1999.)

DPA is a technique using a small difference in the power consumption between the logical "1" and "0" levels in the processing performed by an encryption circuit. The encryption circuit is formed of, for example, a metal oxide semiconductor (MOS) IC. Ideally, no current flows in the MOS IC. However, actually, a leakage current or the like flows in the encryption circuit. The leakage current or the like depends upon the logical "1" or "0" level, resulting in a difference in the power consumption between the logical "1" and "0" levels in the processing performed by the encryption circuit. Furthermore, the power consumption in the encryption circuit increases when data is transformed. In DPA, the encryption key used by the encryption circuit is decoded using the difference in the power consumption.

An encryption circuit that performs encryption using DES generates an intermediate key from an encryption key (i.e., a shared key), and encrypts data using the intermediate key.

The DPA algorithm allows an intermediate key used within an encryption circuit to be relatively easily broken (decoded) by analyzing the power consumption of the encryption circuit. Therefore, the DPA method has a critical problem in view of security for encryption performed by the encryption circuit.

SUMMARY OF THE INVENTION

Accordingly, it is an object of the present invention to provide high security against theft of an encryption key by attacks based on analysis of the power consumption.

In one aspect of the present invention, a data processing circuit for performing processing related to encryption on data includes a processing unit that performs processing related to encryption on the data, a noise generating unit that generates noise, and a superimposing unit that superimposes the noise on a current consumed by the processing unit.

The data processing circuit may further include a timing signal generating circuit that generates a timing signal indicating a timing at which the noise is superimposed on the consumed current, and the superimposing unit may superimpose the noise on the consumed current according to the timing signal.

The processing unit may perform the processing in synchronization with a predetermined clock, and the timing signal generating unit may generate the timing signal based on the predetermined clock.

The data processing circuit may further include a second noise generating unit that generates second noise different from the noise generated by the noise generating unit, and the second noise may further be superimposed on the consumed current.

The noise generating unit may generate noise by summing a plurality of independent signals, and the data processing circuit may further include a control unit that controls the number of signals to be summed for the noise generating unit to generate the noise depending upon a security level of the encryption.

In another aspect of the present invention, a control method for a data processing circuit including a processing unit that performs processing related to encryption on data includes a noise generating step of generating noise, and a superimposing step of superimposing the noise on a current consumed by the processing unit.

In the data processing circuit and control method according to the present invention, noise is generated, and the generated noise is superimposed on a current consumed by a processing unit.

According to the present invention, high security can be provided.

DESCRIPTION OF THE PREFERRED EMBODIMENTS

Embodiments of the present invention will now be described with reference to the drawings.

Figure 1:
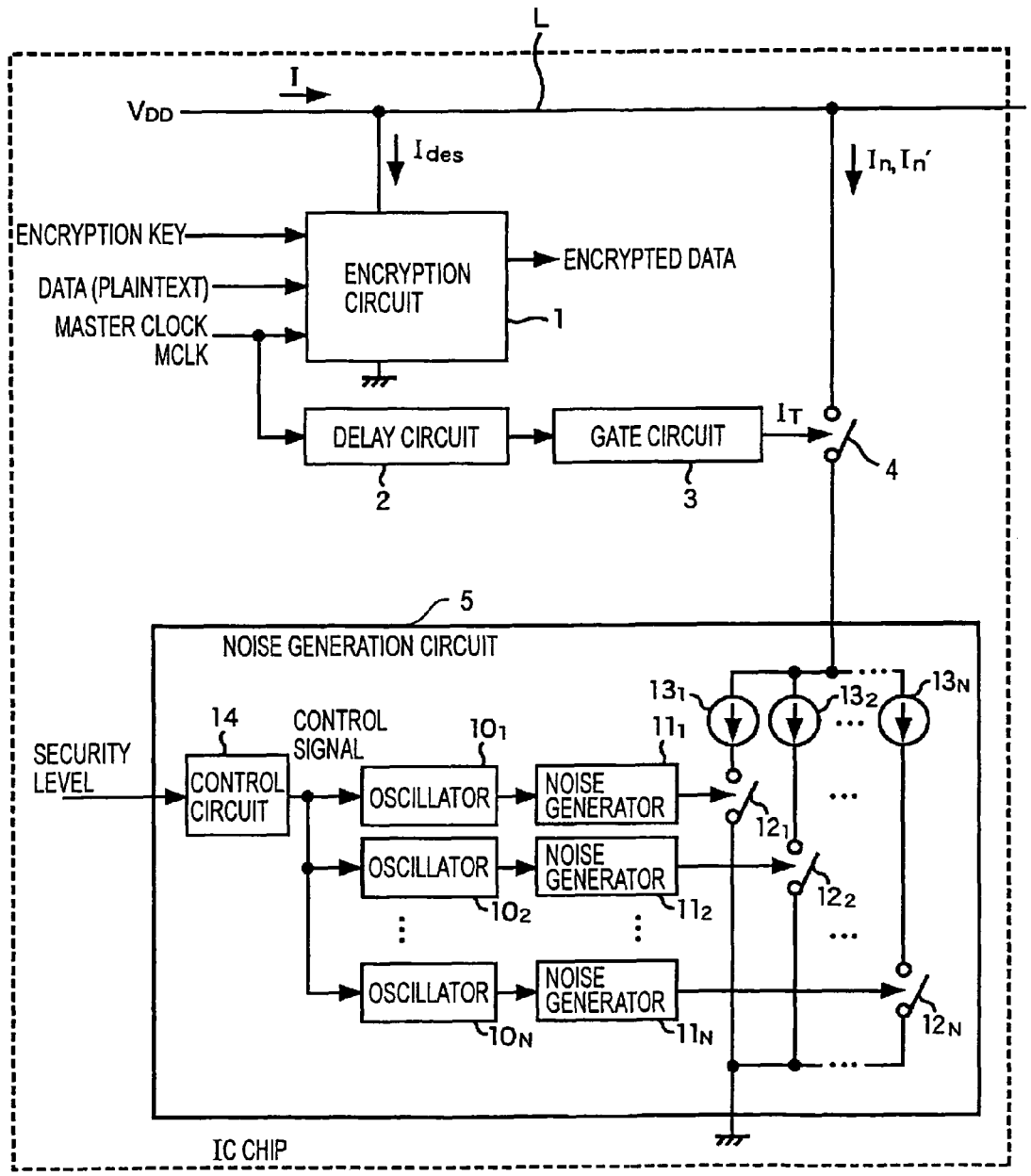
FIG. 1 is a block diagram of an IC chip according to a first embodiment of the present invention.

FIG. 1 illustrates an IC chip according to a first embodiment of the present invention.

In the IC chip shown in FIG. 1, data (plaintext) supplied from the outside of the IC chip is encrypted, and the encrypted data is output to the outside.

In FIG. 1, an encryption key used for encryption, data (plaintext) to be encrypted, and a master clock MCLK are supplied to an encryption processing circuit 1.

The encryption processing circuit 1 encrypts the supplied plaintext data using the supplied encryption key according to, for example, DES in synchronization with the supplied master clock MCLK. Specifically, the encryption processing circuit 1 generates an intermediate key from the supplied encryption key, and encrypts the data using the intermediate key according to DES. The encryption processing circuit 1 outputs the encrypted data to the outside of the IC chip.

A power supply $V_{DD}$ is supplied to the encryption processing circuit 1 from the outside of the IC chip via a power supply line L, and the encryption processing circuit 1 performs encryption in response to the supply of the power supply $V_{DD}$.

In FIG. 1 (and also in FIGS. 5 and 7), a current $I_{des}$ is consumed by the encryption processing circuit 1. The encryption processing circuit 1 is connected to a ground terminal of the IC chip, and the consumed current $I_{des}$ finally flows to the ground terminal of the IC chip.

The master clock MCLK is also supplied to a delay circuit 2. The delay circuit 2 delays the supplied master clock MCLK by the period of time corresponding to a period of time for which the data is transformed by the encryption processing performed by the encryption processing circuit 1, and supplies the delayed clock to a gate circuit 3.

Based on the master clock MCLK supplied from the delay circuit 2, the gate circuit 3 generates a timing signal $I_T$ indicating a timing at which a noise current $I_n$ generated by a noise generation circuit 5, described below, is superimposed on the current $I_{des}$ consumed by the encryption processing circuit 1, and supplies the generated timing signal $I_T$ to a switch 4.

The switch 4 has a first end connected to the power supply line L, and a second end connected to the noise generation circuit 5. The switch 4 is turned on or off according to the timing signal $I_T$ supplied from the gate circuit 3 so that the noise current $I_n$ generated by the noise generation circuit 5 is superimposed on the consumed current $I_{des}$ flowing in the power supply line L.

The noise generation circuit 5 includes N oscillators $10_1$, $10_2$, ..., $10_N$, N noise generators $11_1$, $11_2$, ..., $11_N$, N switches $12_1$, $12_2$, ..., $12_N$, N current sources $13_1$, $13_2$, ..., $13_N$, and a control circuit 14. The noise generation circuit 5 calculates the sum of a plurality of independent signals (currents) to generate a noise current having a Gaussian distribution. More precisely, this noise current is a current that can be regarded as noise whose distribution approaches the Gaussian distribution.

An oscillator $10_n$ drives a noise generator $11_n$ according to a control signal from the control circuit 14, where n=1, 2, ..., N. The noise generator $11_n$ is driven by the oscillator $10_n$ to generate, for example, pseudo-random noise, and the pseudo-random noise is supplied as an output signal to a switch $12_n$.

The switch $12_n$ is turned on or off according to the output signal from the noise generator $11_n$. The switch $12_n$ has a first end connected to the current source $13_n$, and a second end connected to the ground terminal of the IC chip. When the switch $12_n$ is turned on, a current output from a current source $13_n$ flows to the ground terminal of the IC chip via the switch $12_n$.

A first end of the current source $13_n$ is connected to the first end of the switch $12_n$, and a current having a predetermined magnitude (level) is caused to flow via the switch $12_n$. The current sources $13_1$ to $13_N$ have second ends connected to each other, and the node at which the second ends of the current sources $13_1$ to $13_N$ are connected to each other is connected to the second end of the switch 4.

A security level for encryption performed by the encryption processing circuit 1 is supplied to the control circuit 14.

The security level depends upon the importance or confidentiality of data to be encrypted by the encryption circuit 1. The security level may be supplied from the outside of the IC chip or may be preset in the IC chip.

The control circuit 14 controls the oscillators $10_1$ to $10_N$ according to the supplied security level.

In the noise generation circuit 5, the currents caused by the current sources $13_1$ to $13_N$ to flow are summed at the node at which the second ends of the current sources $13_1$ to $13_N$ are connected to each other, and a resulting noise current $I_n$ is caused to flow in the switch 4.

The switch $12_n$ connected to the first end of the current source $13_n$ is turned on or off according to the output signal from the noise generator $11_n$ driven by the oscillator $10_n$. Therefore, the current source $13_n$ causes a current to flow according to the output signal from the noise generator $11_n$.

According to the central limit theorem, a summation signal obtained by summing a plurality of independent signals approaches the Gaussian distribution as the number of signals to be summed increases.

In the noise generation circuit 5, pseudo-random noise signals output from the noise generators $11_1$ to $11_N$ are independent (or orthogonal) signals. Therefore, the currents caused by the current sources $13_1$ to $13_N$ to flow via the switches $12_1$ to $12_N$ are also independent signals.

In the noise generation circuit 5, the independent currents caused by the current sources $13_1$ to $13_N$ to flow are summed at the node at which the second ends of the current sources $13_1$ to $13_N$ are connected to each other, and a current whose distribution approaches the Gaussian distribution, that is, a noise current which is (noise extremely close to) truly random noise, is generated.

In the IC chip shown in FIG. 1, theoretically, a current I flowing in the power supply line L is obtained by superimposing the noise current $I_n$ generated by the noise generation circuit 5 on the current $I_{des}$ consumed by the encryption processing circuit 1, i.e., $I_{des}+I_n$. The current I flowing in the power supply line L is not equal to the current $I_{des}$ consumed by the encryption processing circuit 1, but is a current in which the noise current $I_n$ is superimposed on the consumed current $I_{des}$. Therefore, the current I that can be observed outside the IC chip is determined by superimposing the noise current $I_n$ on the consumed current $I_{des}$, rather than the current $I_{des}$ consumed by the encryption processing circuit 1, thus preventing an intermediate key from being broken by DPA attacks based on analysis of the consumed current $I_{des}$ to provide high security.

The noise current $I_n$ is superimposed on the consumed current $I_{des}$ to hide the consumed current $I_{des}$ from outside the IC chip, and is therefore desirably random (the randomness is high).

On the other hand, according to the central limit theorem, as the number of current sources $13_1$ to $13_N$ increases, a noise current that approaches the Gaussian distribution (i.e., a more random noise current) can be generated. It is therefore desirable to increase the number of current sources $13_1$ to $13_N$ causing independent currents to flow in order to prevent the current I flowing in the power supply line L from being analyzed by DPA.

However, as the number N of current sources $13_1$ to $13_N$ causing independent currents to flow increases, the current consumption of the overall IC chip also increases.

Generally, higher resistance against DPA attacks is required for the demands for higher security level (importance or confidentiality of data to be encrypted by the encryption circuit 1).

The control circuit 14 controls the number of independent currents to be summed for generating a noise current depending upon the security level.

When the security level is low (i.e., when the importance or confidentiality of data to be encrypted by the encryption circuit 1 is low), the control circuit 14 controls the oscillators $10_1$ to $10_N$ to reduce the number of oscillators driving the noise generators $11_1$ to $11_N$ depending upon the security level. The switch $12_n$ is in the off position when the noise generator $11_n$ is not driven by the oscillator $10_n$, thus causing no current to flow from the current source $13_n$.

Therefore, by reducing the number of oscillators driving the noise generators $11_1$ to $11_N$, the number of independent currents to be summed at the node at which the second ends of the current sources $13_1$ to $13_N$ are connected to each other can also be reduced.

In this case, although a slightly less random noise current is generated by the noise generation circuit 5, the current consumption of the overall IC chip can be reduced.

When the security level is high (i.e., when the importance or confidentiality of data to be encrypted by the encryption circuit 1 is high), the control circuit 14 controls the oscillators 10 to $10_N$ to increase the number of oscillators driving the noise generators $11_1$ to $11_N$ depending upon the security level. The switch $12_n$ connected to the current source $13_n$ is turned on or off according to the output pseudo-random noise signal from the noise generator $11_n$ driven by the oscillator $10_n$. Thus, as the number of oscillators driving the noise generators $11_1$ to $11_N$ increases, the number of independent currents to be summed at the node at which the second ends of the current sources $13_1$ to $13_N$ are connected to each other also increases.

In this case, although the current consumption of the overall IC chip slightly increases, a more random noise current can be generated by the noise generation circuit 5, resulting in higher resistance against DPA attacks.

Figure 2:
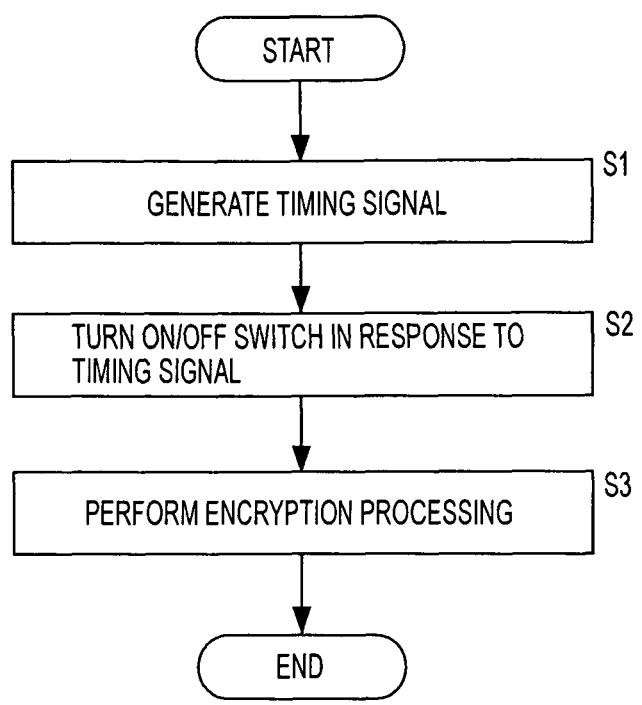
FIG. 2 is a flowchart showing the operation of the IC chip.

FIG. 2 is a flowchart showing the operation of the IC chip shown in FIG. 1.

In step S1, the gate circuit 3 in the IC chip generates a timing signal $I_T$. When the master clock MCLK is supplied to the gate circuit 3 via the delay circuit 2, the gate circuit 3 generates a timing signal $I_T$ based on the master clock MCLK supplied via the delay circuit 2, and supplies the timing signal $I_T$ to the switch 4.

In step S2, the switch 4 is turned on or off according to the timing signal $I_T$ supplied from the gate circuit 3. In response to the on-off operation of the switch 4, flow of the noise current $I_n$ generated by the noise generation circuit 5 is turned on or off. In the power supply line L, the noise current $I_n$ generated by the noise generation circuit 5 is superimposed on the current $I_{des}$ consumed by the encryption processing circuit 1 only when the switch 4 is turned on.

The noise current $I_n$ whose flow is turned on or off in response to the on-off operation of the switch 4 is denoted by $I_n'$.

In step S3, the encryption processing circuit 1 performs encryption processing to encrypt the data supplied to the encryption processing circuit 1.

In the IC chip shown in FIG. 1, the consumed current $I_{des}$ flows to the encryption processing circuit 1 from the power supply line L. The noise current $I_n'$ flows to the noise generation circuit 5 from the power supply line L. The current I flowing in the power supply line L is therefore represented by the sum of the consumed current $I_{des}$ and the noise current $I_n'$.

Figure 3:
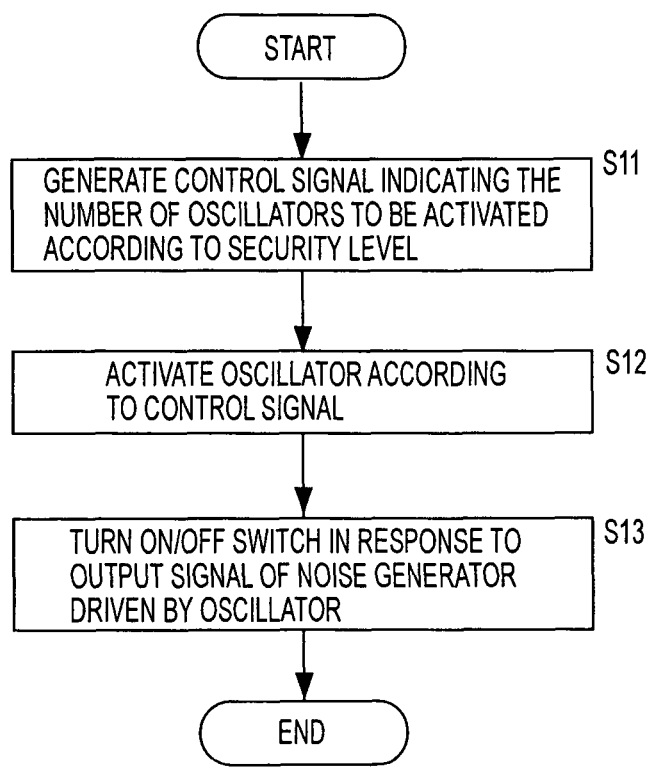
FIG. 3 is a flowchart showing the operation of a noise generation circuit shown in FIG. 1.

FIG. 3 is a flowchart showing the operation of the noise generation circuit 5 shown in FIG. 1.

In step S11, the control circuit 14 in the noise generation circuit 5 determines the number of oscillators to be activated (i.e., the number of oscillators driving the noise generators $11_1$ to $11_N$) depending upon the supplied security level, and generates a control signal indicating the number of oscillators. The control circuit 14 supplies the control signal to the oscillators $10_1$ to $10_N$.

In response to the control signal from the control circuit 14, in step S12, a corresponding number of oscillators $10_1$ to $10_N$ to the number indicated by the control signal from the control circuit 14 are activated to drive the corresponding noise generators $11_1$ to $11_N$. For example, if a number N' is indicated by the control signal from the control circuit 14, where N' is a value from 1 to N, the oscillators $10_1$ to $10_{N'}$ drive the noise generators $11_1$ to $11_{N'}$, and the output signals are supplied from the noise generators $11_1$ to $11_{N'}$ to the switches $12_1$ to $12_{N'}$.

In step S13, the switches $12_1$ to $12_{N'}$ are turned on or off according to the output signals from the noise generators $11_1$ to $11_{N'}$. Then, the independent currents caused by the current sources $13_1$ to $13_{N'}$ to flow are summed at the node at which the second ends of the current sources $13_1$ to $13_N$ are connected to each other, and the resulting noise current $I_n$ is generated.

Figure 4:
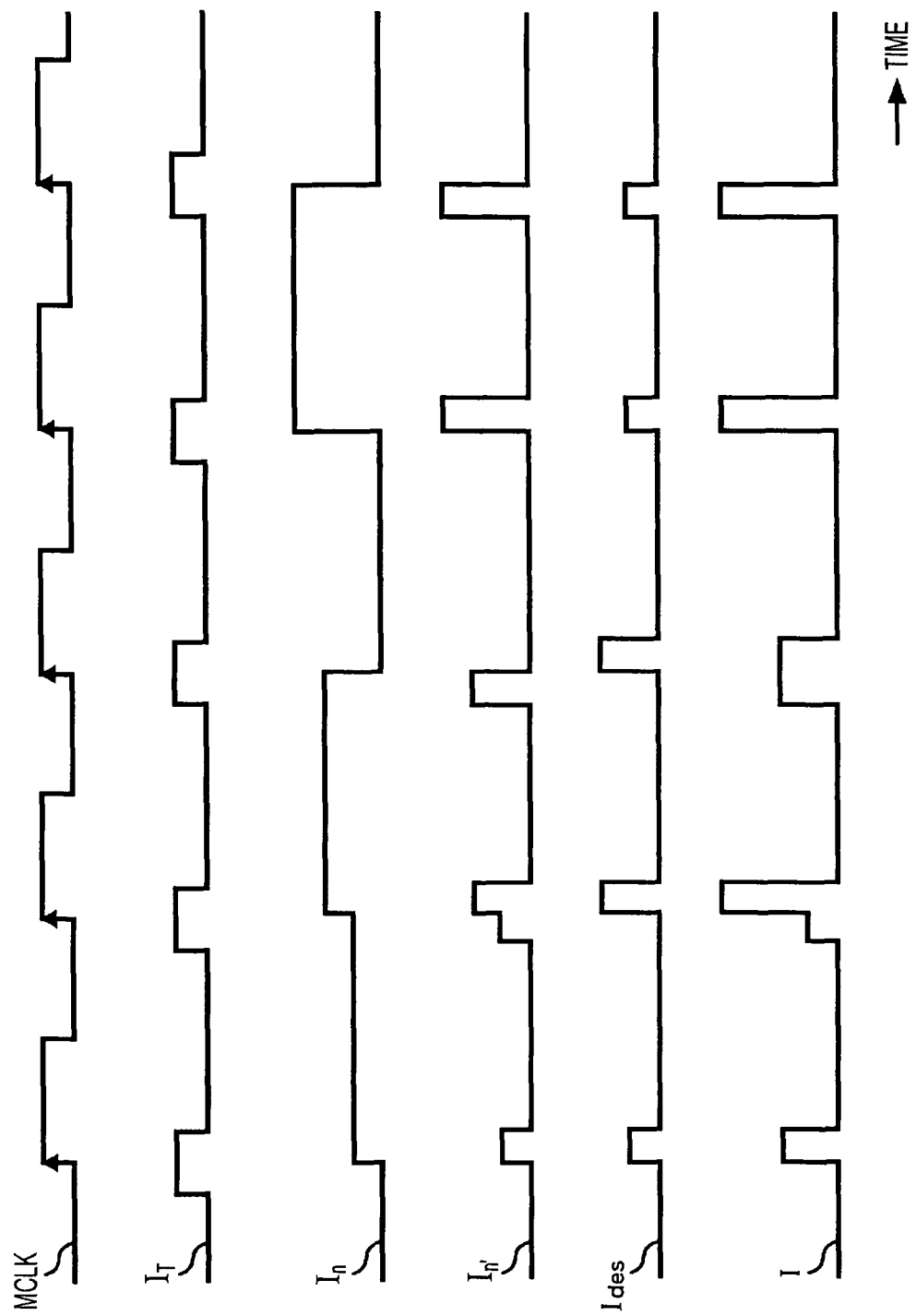
FIG. 4 is a timing chart of signals used in the IC chip shown in FIG. 1.

FIG. 4 is a timing chart showing the signals used in the IC chip shown in FIG. 1.

The encryption processing circuit 1 shown in FIG. 1 is activated, for example, at the rising edge of the master clock MCLK.

In FIG. 4, the timing signal $I_T$ generated by the gate circuit 3 is set to the logical "1" level in the vicinity of the rising edge of the master clock MCLK and is set to the logical "0" level otherwise.

In the IC chip shown in FIG. 1, the noise current $I_n$ generated by the noise generation circuit 5 flows from the power supply line L to the noise generation circuit 5 (or the switch 4) when the switch 4 is in the on position.

Although the noise current $I_n$ generated by the noise generation circuit 5 changes in synchronization with the master clock MCLK in FIG. 4, the noise current $I_n$ does not need to change in synchronization with the master clock MCLK. The signals output from the noise generators $11_1$ to $11_N$ to generate the noise current $I_n$ need not be synchronized with each other, or need not be synchronized with the master clock MCLK.

The noise current $I_n'$ flows from the power supply line L to the noise generation circuit 5 in response to the on-off operation of the switch 4 according to the timing signal $I_T$. The noise current $I_n'$ is equivalent to the noise current $I_n$ for a period of time during which the timing signal $I_T$ is set to the logical "1" level.

FIG. 4 further shows the current $I_{des}$ consumed by the encryption processing circuit 1, and the current I flowing in the power supply line L. The current I is a current in which the noise current $I_n'$ is superimposed on the consumed current $I_{des}$.

As shown in FIG. 4, the consumed current $I_{des}$ is hidden in the current I.

The consumed current $I_{des}$ can also be hidden by superimposing the noise current $I_n$ generated by the noise generation circuit 5, rather than the noise current $I_n'$, on the consumed current $I_{des}$.

However, if the noise current $I_n$ generated by the noise generation circuit 5 is superimposed on the consumed current $I_{des}$, the noise current $I_n$ always flows, and therefore the current consumption of the overall IC chip increases.

For example, if a noise current is superimposed at a timing at which no difference in the consumed current $I_{des}$ between the logical "0" and "1" levels occurs in the encryption processing performed by the encryption processing circuit 1, it may be difficult to hide the current $I_{des}$ consumed by the encryption processing circuit 1.

In the IC chip shown in FIG. 1, a noise current is superimposed at a timing at which a difference in the consumed current $I_{des}$ between the logical "0" and "1" levels occurs in the encryption processing performed by the encryption processing circuit 1. More specifically, a noise current is superimposed for periods of time including the rising edges of the master clock MCLK at which the encryption processing circuit 1 shown in FIG. 1 is activated, that is, for periods of time during which the timing signal $I_T$ is set to the logical "1" level.

Thus, the current $I_{des}$ consumed by the encryption processing circuit 1, that is, the difference in the consumed current $I_{des}$ between the logical "0" and "1" levels in the encryption processing performed by the encryption processing circuit 1, can be hidden, and the power consumption of the overall IC chip can be reduced.

Figure 5:
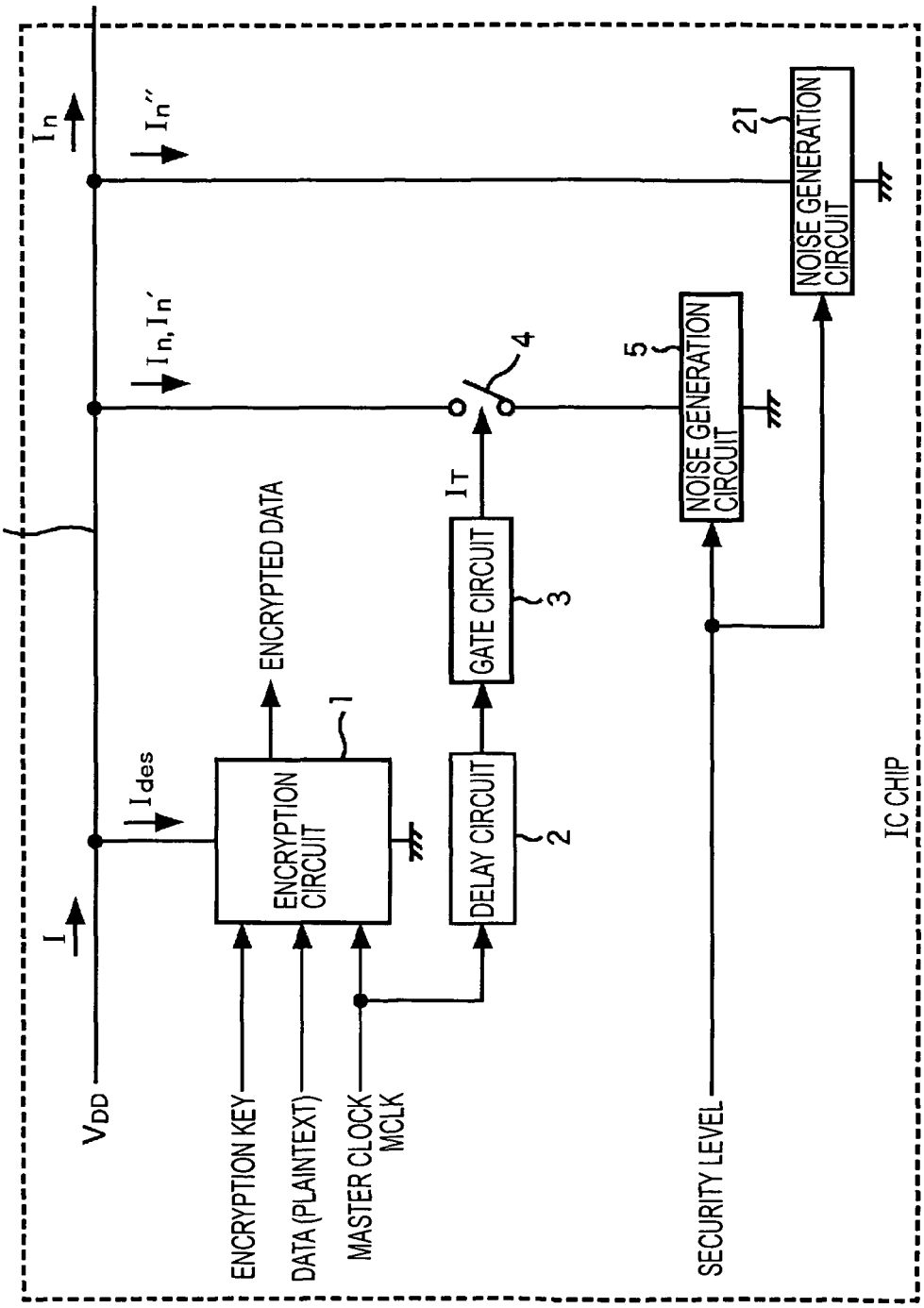
FIG. 5 is a block diagram of an IC chip according to a second embodiment of the present invention.

FIG. 5 is a diagram of an IC chip according to a second embodiment of the present invention. In FIG. 5, the corresponding components to those shown in FIG. 1 are assigned the same reference numerals, and a description thereof is omitted. The IC chip shown in FIG. 5 has a similar structure to that of the IC chip shown in FIG. 1, except that it further includes a noise generation circuit 21.

The noise generation circuit 21 has a similar structure to that of the noise generation circuit 5 shown in FIG. 1. However, the noise generation circuits 5 and 21 generate different types of noise currents.

In FIG. 5, the noise generation circuit 21 generates a noise current $I_n''$.

In the IC chip shown in FIG. 5, the noise current $I_n''$ generated by the noise generation circuit 21 flows to the noise generation circuit 21 from the power supply line L. The current I flowing in the power supply line L is obtained by superimposing the noise current $I_n'$ flowing via the switch 4 and the noise current $I_n''$ on the current $I_{des}$ consumed by the encryption processing circuit 1.

Like the noise generation circuit 5, the noise generation circuit 21 controls the number of independent signals to be summed for generating the noise current $I_n''$ depending upon the security level.

Figure 6:
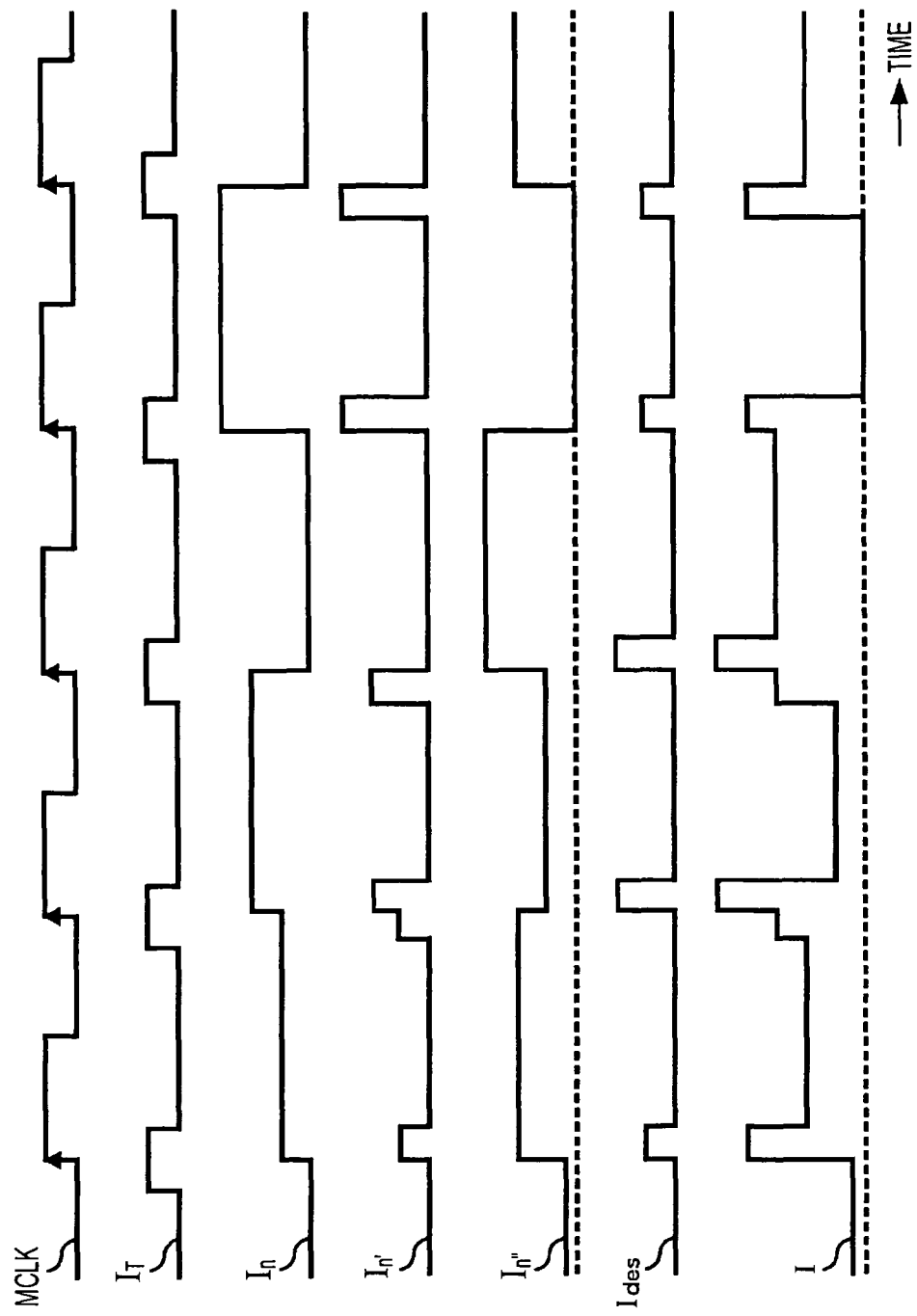
FIG. 6 is a timing chart of signals used in the IC chip shown in FIG. 5.

FIG. 6 is a timing chart showing the signals used in the IC chip shown in FIG. 5.

The master clock MCLK, the timing signal $I_T$, the noise current $I_n$, the noise current $I_n'$, and the current $I_{des}$ consumed by the encryption processing circuit 1 shown in FIG. 6 are the same as those shown in FIG. 4.

Although the noise current $I_n$ changes in synchronization with the master clock MCLK in FIG. 6, the noise current $I_n$ does not need to change in synchronization with the master clock MCLK. The same applies to the noise current $I_n''$.

FIG. 6 further shows the noise current $I_n''$ generated by the noise generation circuit 21, and the current I flowing in the power supply line L. The current I is a current in which the noise currents $I_n'$ and $I_n''$ are superimposed on the consumed current $I_{des}$.

As shown in FIG. 6, the consumed current $I_{des}$ is hidden in the current I.

The noise current $I_n'$ shown in FIG. 6 (or FIG. 4) is caused to flow only for a period of time during which the switch 4 is turned on according to the timing signal $I_T$, and is therefore a dynamic noise current in accordance with the timing signal $I_T$.

On the other hand, the noise current $I_n''$ shown in FIG. 6 always flows from the power supply line L to the noise generation circuit 21, and is therefore a static noise current.

In the IC chip shown in FIG. 5, the current $I_{des}$ consumed by the encryption processing circuit 1 is hidden by the dynamic noise current $I_n'$ and the static noise current $I_n''$. Thus, the IC chip shown in FIG. 5 can provide higher resistance against DPA attacks than the IC chip shown in FIG. 1.

Figure 7:
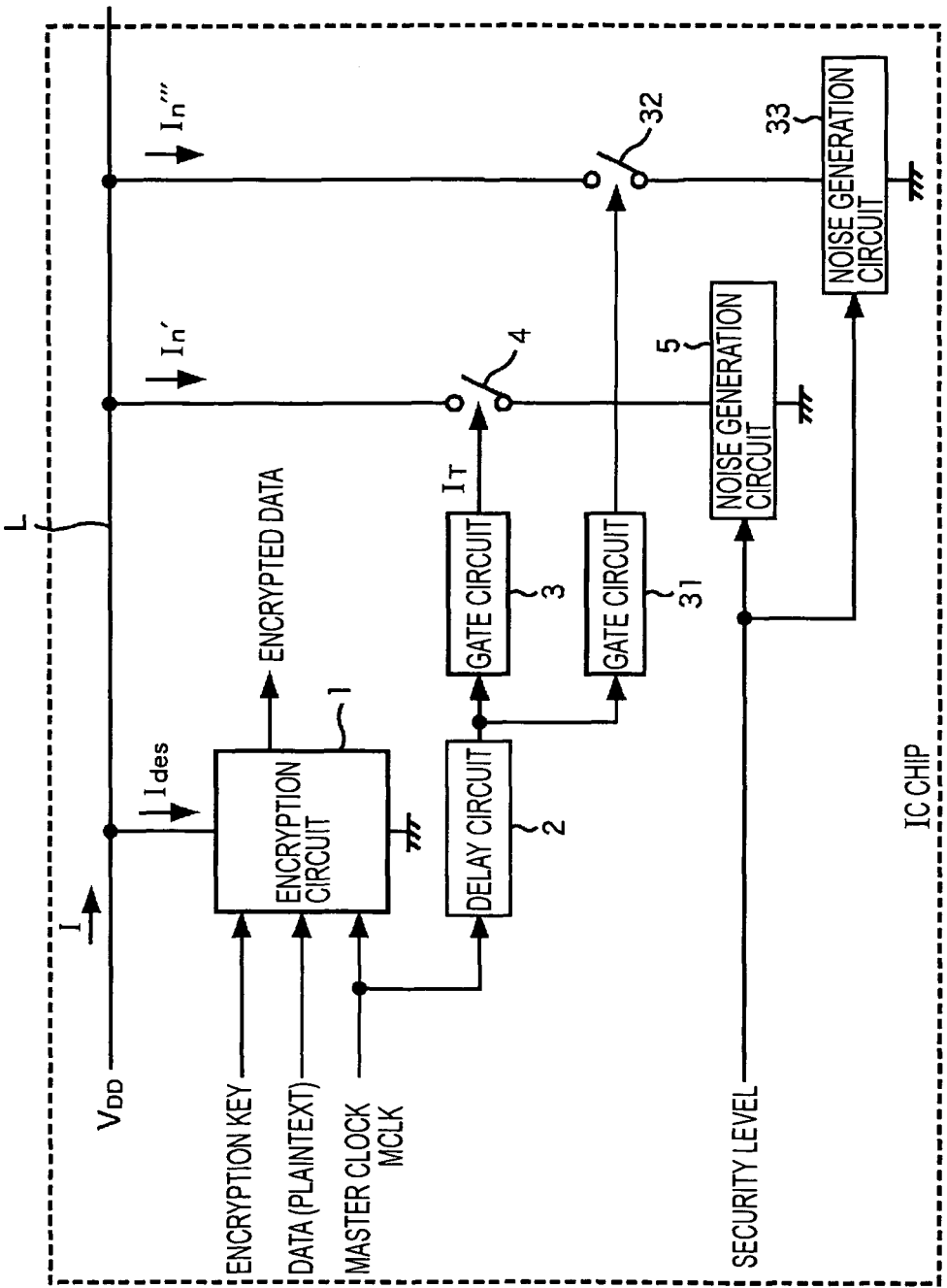
FIG. 7 is a block diagram of an IC chip according to a third embodiment of the present invention.

FIG. 7 is a diagram of an IC chip according to a third embodiment of the present invention. In FIG. 7, the corresponding components to those shown in FIG. 1 are assigned the same reference numerals, and a description thereof is omitted. The IC chip shown in FIG. 7 has a similar structure to that of the IC chip shown in FIG. 1, except that it further includes a gate circuit 31, a switch 32, and a noise generation circuit 33.

Like the gate circuit 3, the gate circuit 31 generates a timing signal based on the master clock MCLK output from the delay circuit 2, and supplies the generated timing signal to the switch 32. The timing signal generated by the gate circuit 31 is set to the logical "1" level at a timing (period of time) different from that of the timing signal $I_T$ output from the gate circuit 3.

The switch 32 is turned on or off according to the timing signal output from the gate circuit 31.

As described above, the gate circuit 31 generates a timing signal different from the timing signal $I_T$ output from the gate circuit 3. Thus, the switches 4 and 32 are turned on or off at different timings.

The noise generation circuit 33 has a similar structure to that of the noise generation circuit 5 shown in FIG. 1. The noise generation circuits 5 and 33 may generate different types of noise currents, like the noise generation circuits 5 and 21 shown in FIG. 5, or may generate the same type of noise currents.

In the IC chip shown in FIG. 7, the on-off operation of the switch 32 causes a noise current $I_n'''$ to flow from the power supply line L to the noise generation circuit 33. The noise current $I_n'''$ is a dynamic noise current, like the noise current $I_n'$ caused by the on-off operation of the switch 4 to flow from the power supply line L to the noise generation circuit 5.

In the IC chip shown in FIG. 7, therefore, the dynamic noise currents $I_n'$ and $I_n'''$ different from each other are superimposed on the current $I_{des}$ consumed by the encryption processing circuit 1. That is, in the IC chip shown in FIG. 7, the consumed current $I_{des}$ is hidden by the two different dynamic noise currents $I_n'$ and $I_n'''$. Thus, like the IC chip shown in FIG. 5, the IC chip shown in FIG. 7 can provide higher resistance against DPA attacks than the IC chip shown in FIG. 1.

In the second and third embodiments shown in FIGS. 5 and 7, two different noise currents are superimposed on the current $I_{des}$ consumed by the encryption processing circuit 1. However, three or more noise currents may be superimposed on the consumed current $I_{des}$.

The IC chip shown in FIG. 5 may not include the delay circuit 2, the gate circuit 3, and the noise generation circuit 5. In this case, only the static noise current $I_n''$ generated by the noise generation circuit 21 is superimposed on the current $I_{des}$ consumed by the encryption processing circuit 1. The equivalent configuration to that of the IC chip shown in FIG. 5 that does not include the delay circuit 2, the gate circuit 3, and the noise generation circuit 5 can be implemented by the IC chip shown in FIG. 1 in which the switch 4 remains on.

The IC chip shown in FIG. 1 may select a mode in which the switch 4 is always in the on position or a mode in which the switch 4 is turned on or off according to the timing signal $I_T$ output from the gate circuit 3.

In the illustrated embodiments, the present invention has been described in the context of an IC chip that performs DES encryption. However, the present invention may also be applied to an IC chip that performs any type of encryption other than DES encryption, or an IC chip that performs not only encryption processing but also processing related to encryption, such as decryption.

The present invention may be applied not only to an IC chip but also to an IC card that performs data encryption or processing related to encryption, e.g., decryption, a reader/writer, or any other PDA (Personal Digital Assistant) having an IC card function, such as a cellular phone.

The illustrated embodiments are merely examples of the present invention, and the present invention is not limited to these embodiments. A variety of modifications may be made without departing from the scope of the invention.

What is claimed is:

1. A data processing circuit for performing processing related to encryption on data, comprising:
    processing means for performing processing related to encryption on the data;
    timing means for supplying a master clock;
    delaying means for supplying a delay clock;
    noise generating means for generating noise;
    superimposing means for superimposing the noise generated by the noise generating means on a current consumed by the processing means; and
    timing signal generating means for generating a timing signal indicating a timing at which the noise generated by the noise generating means is superimposed on the current consumed,
    wherein the processing means performs the processing in synchronization with the supplied master clock;
    wherein the delaying means supplies the delay clock by delaying the master clock by a delay period of time corresponding to a processing period of time for which the data is encrypted by the processing means;
    wherein the timing signal generating means generates the timing signal according to the delay clock supplied by the delaying means; and
    wherein the delay period of time is set such that the timing signal is set to a first logical level in the vicinity of a beginning of the processing period of time and a second logical level otherwise.

2. The data processing circuit according to claim 1, further comprising:
    second noise generating means for generating second noise different from the noise generated by the noise generating means,
    wherein the second noise is further superimposed on the consumed current.

3. The data processing circuit according to claim 1, wherein:
    the noise generating means generates noise by summing a plurality of independent signals; and
    the data processing circuit further comprises control means for controlling the number of signals to be summed for the noise generating means to generate the noise depending upon a security level of the encryption.

4. The data processing circuit according to claim 1, wherein:
    the first logical level is a logical "1" level; and
    the second logical level is a logical "0" level.

5. A data processing circuit for performing processing related to encryption on data, comprising:
    a processing unit configured to perform processing related to encryption on the data;
    a timing unit configured to supply a master clock;
    a delay unit configured to supply a delayed clock;
    a noise generating unit configured to generate noise;
    a superimposing unit configured to superimpose the noise generated by the noise generating unit on a current consumed by the processing unit; and
    a timing signal unit configured to generate a timing signal indicating a timing at which the noise generated by the noise generating unit is superimposed on a current consumed by the processing unit,
    wherein the processing unit performs the processing in synchronization with the supplied master clock;
    wherein the delay unit supplies the delay clock by delaying the master clock by a delay period of time corresponding to a processing period of time for which the data is encrypted by the processing means;
    wherein the timing signal unit generates the timing signal according to the delayed clock supplied by the delay unit; and
    wherein the delay period of time is set such that the timing signal is set to a first logical level in the vicinity of a beginning of the processing period of time and a second logical level otherwise.

6. The data processing circuit according to claim 5, further comprising:
    a second noise generator configured to generate second noise different from the noise generated by the noise generator,
    wherein the second noise is further superimposed on the consumed current.

7. The data processing circuit according to claim 5, wherein the noise generator generates noise by summing a plurality of independent signals, and the data processing circuit further comprises a controller configured to control the number of signals to be summed for the noise generator to generate the noise depending upon a security level of the encryption.

8. The data processing circuit according to claim 5, wherein:
    the noise generating unit generates noise by summing a plurality of independent signals; and
    the processing unit further comprises a control unit which controls the number of signals to be summed for the noise generating unit to generate the noise depending upon a security level of the encryption.

9. The data processing circuit according to claim 5, wherein:
    the first logical level is a logical "1" level; and
    the second logical level is a logical "0" level.

10. A control method for a data processing circuit including processing means for performing processing related to encryption on data, the control method comprising:
    supplying a master clock to the processing means;
    supplying the master clock also to a delaying means;
    generating a first noise;
    performing processing on the data;

delaying the master clock by a delay period of time corresponding to a processing period of time for which the processing means performs the processing on the data;
supplying a delayed master clock to a timing signal generating means;
generating a timing signal indicating a timing at which the first noise is superimposed on the current consumed by the processing means, wherein the delay period of time is set such that the timing signal is set to a first logical level in the vicinity of a beginning of the processing period of time and a second logical level otherwise; and
superimposing the first noise on the current consumed by the processing means.

11. The control method according to claim 10, further comprising:
generating a second noise different from the first noise; and
superimposing the second noise on the consumed current.

12. The control method according to claim 10, further comprising:
generating the first noise by summing a plurality of independent signals; and
controlling the number of signals to be summed to generate the first noise depending upon a security level of the encryption.

13. The control method according to claim 10, wherein:
the first logical level is a logical "1" level; and
the second logical level is a logical "0" level.

* * * * *